United States Patent [19]
Katagiri

[11] Patent Number: 5,065,243
[45] Date of Patent: Nov. 12, 1991

[54] MULTI-SCREEN HIGH-DEFINITION TELEVISION RECEIVER
[75] Inventor: Takato Katagiri, Fukaya, Japan
[73] Assignee: Kabushiki Kaisha Toshiba, Kawasaki, Japan
[21] Appl. No.: 567,743
[22] Filed: Aug. 15, 1990
[30] Foreign Application Priority Data
Sep. 26, 1989 [JP] Japan ................................. 1-249848
[51] Int. Cl.$^5$ .............................................. H04N 5/45
[52] U.S. Cl. .................................... 258/183; 358/22; 358/140
[58] Field of Search ................... 358/183, 140, 22 PIP, 358/12, 11

[56] References Cited
U.S. PATENT DOCUMENTS
4,982,288 1/1991 Isobe et al. ......................... 358/183

FOREIGN PATENT DOCUMENTS
63-200681 8/1988 Japan .

Primary Examiner—Howard W. Britton
Assistant Examiner—Kim Yen Vu
Attorney, Agent, or Firm—Cushman, Darby & Cushman

[57] ABSTRACT

Current television signals are converted into sequential scanning signals in a sequential scanning conversion circuit and supplied to a memory circuit. In the memory circuit, the sequential scanning signals are converted into interlaced scanning signals, and then the signals are time-compressed and converted into small screen signals. High-definition television signals decoded by a MUSE decoder are supplied to a selector as master screen signals. In the selector, the master and slave screen signals are selectively produced to form a picture-in-picture signal.

2 Claims, 7 Drawing Sheets

FIG. 4 MEMORY CIRCUIT

MULTI-SCREEN HIGH-DEFINITION TELEVISION RECEIVER

BACKGROUND OF THE INVENTION

1. Field of the Invention

The present invention relates to a television receiver and, more particularly, to a multi-screen high-definition television receiver for inserting current television signals in a high-definition screen and displaying a high-definition image and an image produced from the current television signals.

Digital integrated circuits have recently progressed in performance and, in particular, a memory whose access speed is high and manufacturing cost is low has been developed. The use of the memory enables digital processing of video signals. A television receiver having an image memory for carrying out functions of displaying still pictures and intermittently and slowly displaying pictures and a PIP (picture in picture) function of simultaneously displaying images on two screens, is commercialized.

The television market needs a high-definition television receiver having a large-sized screen. An EDTV (Extended Definition Television) for digitally processing television signals between frames or fields and converting interlaced scanning signals into sequential scanning signals, is developed to display current television signals with higher quality. The EDTV is disclosed in IEEE TRANSACTIONS ON COMMUNICATIONS, VOL. COM-32, NO.8, AUGUST 1984, "Extended Definition TV Fully Compatible with Existing Standards" by Fikinuki et al.

On the other hand, a new type high-definition television receiver is going to be put into practice.

A high-definition television signal has 1125 scanning lines, interlace scanning of 2:1, a field frequency of 60.00 Hz, and an aspect ratio of 16:9. The high-definition television signal enables a wider screen and twice or more times as high definition in the longitudinal and lateral directions of the screen as the current television signal does. The current television signal has 525 scanning lines and whose interlace scanning is 2:1, field frequency is 59.94 Hz, and aspect ratio is 4:3. It is thus possible to enjoy TV programs with the real ambience. As the high-definition television receiver, a MUSE (Multiple Sub-Nyquist Sampling Encoding) system is used which is disclosed in INTERNATIONAL BROADCASTING SYMPOSIUM ON RADIO AND TELEVISION ENGINEERING, 1985, SESSION 2-(7), "Transmission of HDTV by MUSE system" by Yuichi N-NOMIYA et al.

When high-definition television receivers are commercialized in the near future under the condition mentioned above, the functions of the current television receivers, especially the PIP function will be certainly required in the high-definition television receivers.

SUMMARY OF THE INVENTION

It is accordingly an object of the present invention to provide a multi-screen high-definition television receiver for inserting current television signals in a high-definition screen and displaying a high-definition image and an image produced from the current television signals.

To attain the above object, there is provided a multi-screen high-definition television receiver comprising: first means for receiving and demodulating a first interlaced scanning television signal; second means for receiving and demodulating a second interlaced scanning television signal whose scanning lines are about twice as many as that of the first interlaced scanning television signal; sequential scanning conversion means for converting the first interlaced scanning television signal output from said first means into a sequential scanning television signal; memory means for synchronizing the sequential scanning television signal output from said sequential scanning conversion means with a field frequency of the second interlaced scanning television signal, time-compressing the sequential scanning television signal and, converting the sequential scanning television signal into a third interlaced scanning television signal in accordance with even and odd fields of the second interlaced scanning television signal; and means for selectively producing a fourth interlaced scanning television signal output from said memory means and the second interlaced scanning television signal. According to the above-described multi-screen high-definition television receiver of the present invention, sequential scanning signals into which current television signals are converted are supplied to memory sections, and the sequential scanning signals are read out from the memory sections as interlaced scanning signals in accordance with even and odd fields on the large screen. It is thus possible to insert a small screen represented by the current television signal which degrades no image quality, in the large screen represented by the high-definition television signal.

DETAILED DESCRIPTION OF THE PREFERRED EMBODIMENTS

An embodiment of the present invention will be described with reference to the accompanying drawings.

Figure 1:
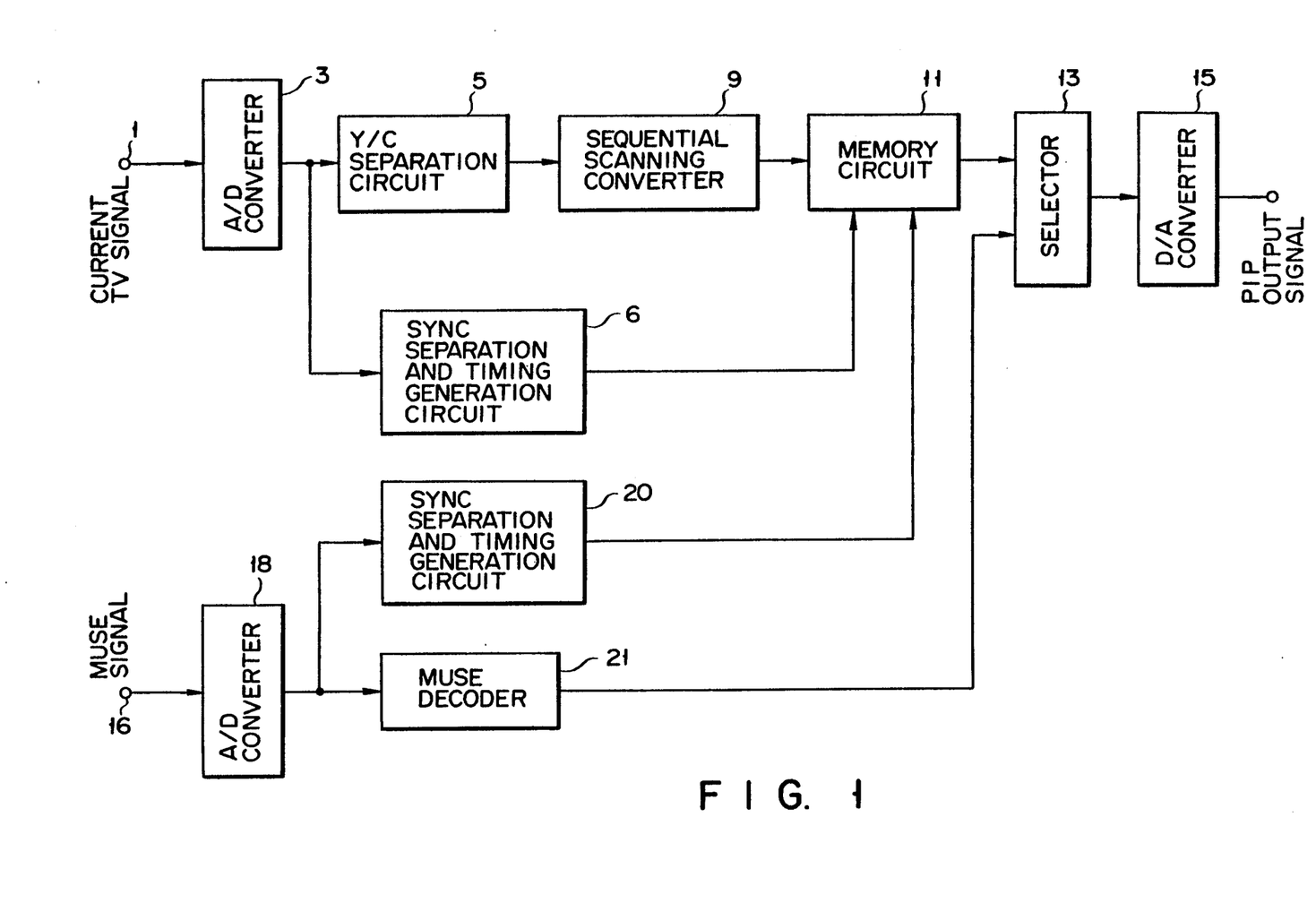
FIG. 1 is a block diagram showing a multi-screen high-definition television receiver according to an embodiment of the present invention.

FIG. 1 is a block diagram showing a multi-screen high-definition television receiver according to an embodiment of the present invention.

Figure 2:
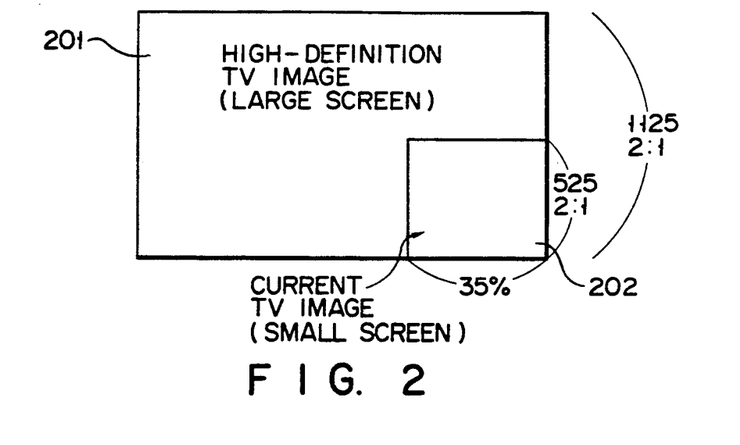
FIG. 2 is a view illustrative of a state of multi-screen display.

FIG. 2 is a view illustrative of a current television screen (small screen) which is inserted into a high definition television screen (large screen). In FIG. 2, reference numeral 201 denotes an area of the large screen and 202 indicates an area of the small screen. Since a high-definition television signal and a current television signal originally differ in the number of scanning lines, the difference is effectively utilized in the present invention. The current television signal is used as a signal for the small screen without reducing the number of the scanning lines and, in other words, without degrading any vertical definition.

In the large and small screens illustrated in FIG. 2, the ratio of the length of the small screen to that of the large screen is 525 to 1125, and thus the width of the small screen is 35 percent ($=525/1125\times 3/4\times 100$) of that of the large screen. Accordingly, the area of the small screen is about 16 percent ($=525/1125\times 525/1125\times 3/4\times 100$) of that of the large screen.

The arrangement of the multi-screen high-definition television receiver shown in FIG. 1 will be described. A current-type composite video signal is supplied to input terminal 1 and then sent to analog-to-digital (hereinafter referred to as A/D) converter 3. In A/D converter 3, a current television signal is digitalized by the clock frequency (hereinafter referred to as 4fsc) which is four times as high as the frequency of a color subcarrier, and the digitalized signal is input to luminance signal/chrominance signal circuit (hereinafter referred to as Y/C separation circuit) 5 and sync signal separation/timing signal generation circuit 6. In Y/C separation circuit 5, a luminance signal and a chrominance signal are separated from each other and the chrominance signal is color-demodulated. The separated luminance signal and chrominance signal are input to sequential scanning converter 9. In FIG. 1, only a luminance signal line is shown.

An interlaced scanning signal is converted into a sequential scanning signal, and then the sequential scanning signal is input to memory circuit 11.

Memory circuit 11 is designed to adapt the sequential scanning signal (conversion signal) to a television signal of a MUSE system. Memory circuit 11 time-compresses the conversion signal to be output as a signal for the small screen formed by the conversion signal so that the small screen can be included in area 202 shown in FIG. 2.

The signal for the small screen is supplied to one of input terminals of selector 13. The other input terminal is supplied with a high-definition television signal from MUSE decoder 21 as a signal for the large screen. Selector 13 selects the signal for the large screen during the large screen display period and selects the signal for the small screen during the small screen display period. The large screen display period and the small screen display period correspond to areas 201 and 202 shown in FIG. 2, respectively. An output signal of selector 13 is supplied to D/A converter 15, and converted into an analog television signal and output as a PIP signal.

Memory circuit 11 is supplied with signals of horizontal sync pulse H and vertical sync pulse V from sync signal separation/timing signal generation circuit 6 and signals of horizontal sync pulse, filed pulse and frame pulse from sync signal separation/timing signal generation circuit 20. Sync signal separation/timing signal generation circuit 20 separates a sync signal from a digital MUSE signal output from A/D converter 18 and generates timing signals of various types. A/D converter 18 converts a baseband MUSE signal input to terminal 16 into a digital signal. The digital MUSE signal output from A/D converter 18 is also supplied to MUSE decoder 21. The MUSE decoder is described in the foregoing INTERNATIONAL BROADCASTING SYMPOSIUM ON RADIO AND TELEVISION ENGINEERING.

Figure 3:
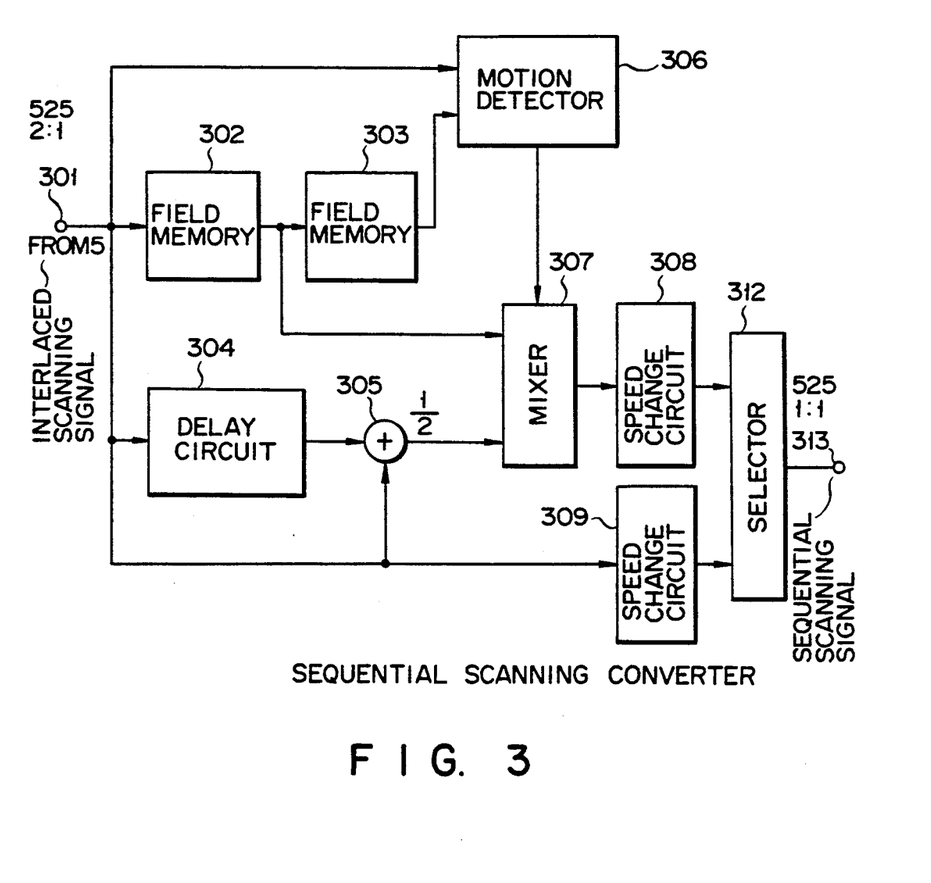
FIG. 3 is a block diagram showing a sequential scanning converter of the multi-screen high-definition television receiver shown in FIG. 1.

FIG. 3 shows the arrangement for processing brightness signals in sequential scanning converter circuit 9 which is a motion adjustable type.

An interlaced scanning signal supplied to terminal 301 is input to field memory 302. An output signal of field memory 302 is supplied to field memory 303. The interlaced scanning signal is also input to 1H delay circuit 304, adder 305, speed change circuit 309 and motion detector 306. 1H delay circuit 304 has an amount of delay corresponding to one horizontal period. Motion detector 306 carries out an operation corresponding to a difference in frame between an output signal of field memory 303 and an input signal of terminal 301 to produce a motion detection signal. The motion detection signal is supplied to a control terminal of mixture circuit 307, and mixture circuit 307 controls the mixture ratio of two signals input thereto.

Adder 305 adds an input signal and an output signal of 1H delay circuit 304 to produce an average signal. The average signal is supplied to one of input terminals of mixture circuit 307. The other input terminal of mixture circuit 307 is supplied with an output of field memory 302 which is a signal before one field. The two input signals are mixed in mixture circuit 307 in the ratio according to the motion detection signal, and an output signal (interpolation signal) of the mixture circuit is input to speed change circuit 308.

Speed change circuits 308 and 309 include memories. In the memories, the read frequency (clock frequency 8fsc) is twice as high as the write frequency (clock frequency 4fsc). The period of 1H of the current-type video signal is half compressed. Output signals of speed change circuits 308 and 309 are supplied to selector 312. Selector 312 selects the output signals of speed change circuits 308 and 309 at a half cycle of 1H of the current-type video signal. Thus sequential scanning video signals (525/1:1) can be produced from output terminal 313.

Figure 4:
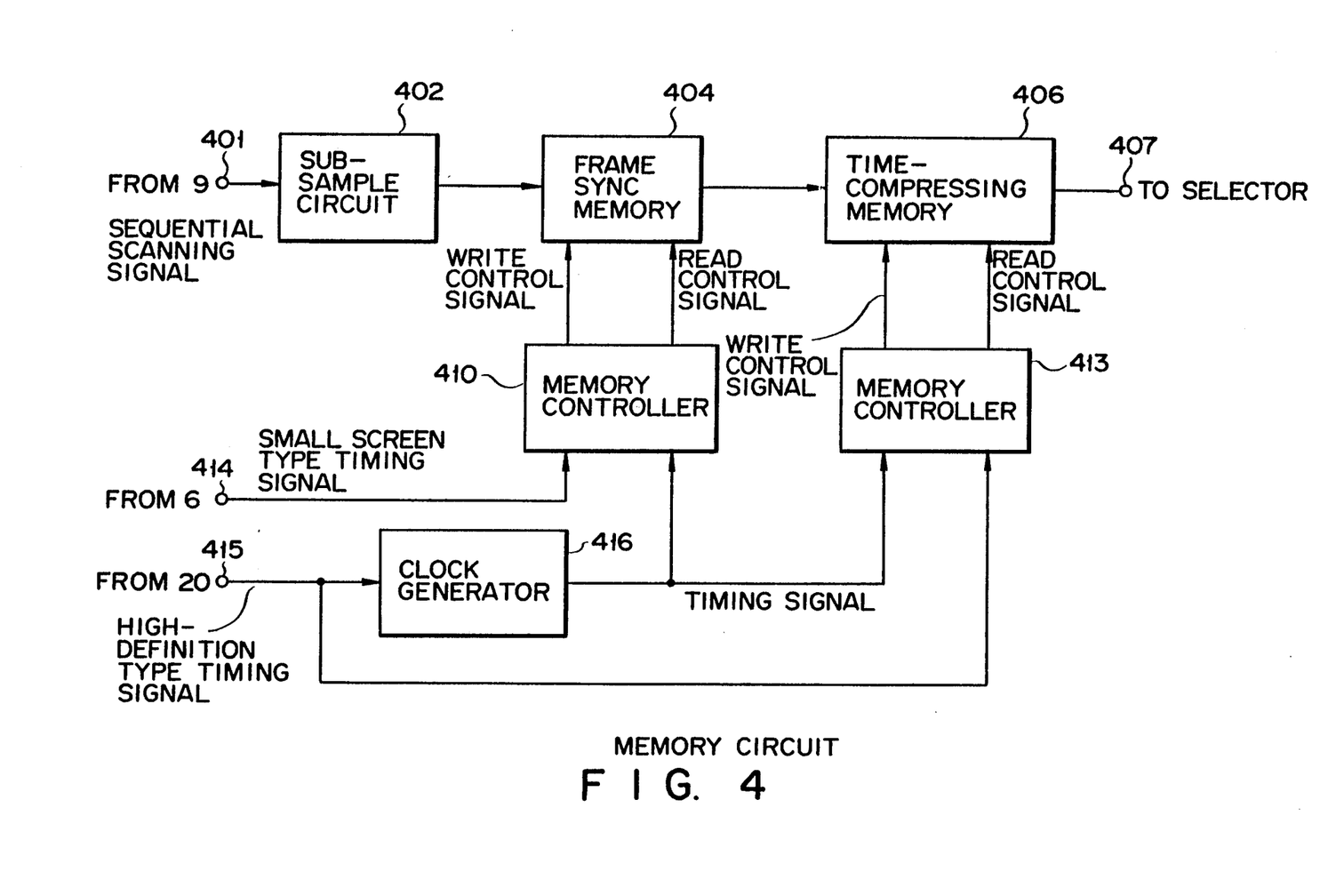
FIG. 4 is a block diagram specifically showing a memory circuit of the multi-screen high-definition television receiver shown in FIG. 1.

FIG. 4 shows the arrangement for processing brightness signals in memory circuit 11. A sequential scanning signal input to terminal 401 is subjected to a sampling processing, i.e., a low-band filtering processing in sub-sampling circuit 402. The number of samples of 1H is reduced from 910 to 455 and therefore the clock frequency of a signal output from sub-sampling circuit 402 is reduced from 8fsc to 4fsc.

The conversion signal is input to frame synchronizing memory 404 capable of asynchronously performing writing and reading operations. Memory 404 is controlled by memory controller 410. Memory controller 410 is supplied with a small screen type timing signal from terminal 414 and supplied with a high-definition type timing signal from clock generation circuit 416. Terminal 414 is supplied with a timing signal from sync signal separation/timing signal generation circuit 6. Clock generation circuit 416 is supplied with a timing signal from terminal 415. Terminal 415 is supplied with a timing signal from sync signal separation/timing signal generation circuit 20.

A write control signal supplied to memory 404 contains a clock signal (4fsc) and a field reset signal (59.94 Hz), and a read control signal contains a clock signal (4fsc=455×525×60Hz) and a field reset signal (60.00 Hz).

A signal output from frame synchronizing memory 404 is thus synchronized with the frame frequency of a high-definition television signal.

The output signal of memory 404 is supplied to time-compressing memory 406 at the next stage of memory 404. Memory 406 also enables writing and reading to be asynchronously performed. Although a signal input to memory 406 is synchronized with the frame frequency of the high-definition television signal representing the large screen, it is a sequential scanning signal of 525 scanning lines. In memory 406, time is compressed to form the small screen as shown in FIG. 2. More specifically, one of even and odd lines is written in memory 406 by the clock frequency of 4fsc (since an input or output signal of memory 406 is synchronized with the frame frequency of the high-definition television signal, it is known beforehand whether the field of the large screen is odd or even directly before and after the signal is input or output), only the available period of the small screen is read out from the memory by the clock frequency (44.55 MHz = 1320 sample/H × 1125 × 30) of the high-definition television signal. This clock frequency will be described later.

Since the number of 1H samples of the small screen is 445, the horizontal period of the small screen with respect to the large screen is 455/1320 = 0.345 and it is virtually equal to horizontal period 0.35 shown in FIG. 2, which hardly causes any problem of distortion of images with respect to roundness. Memory controller 413 receives a timing signal generated by clock generation circuit 416 and a high-definition type timing signal and supplies write and read control signals.

Figure 5:
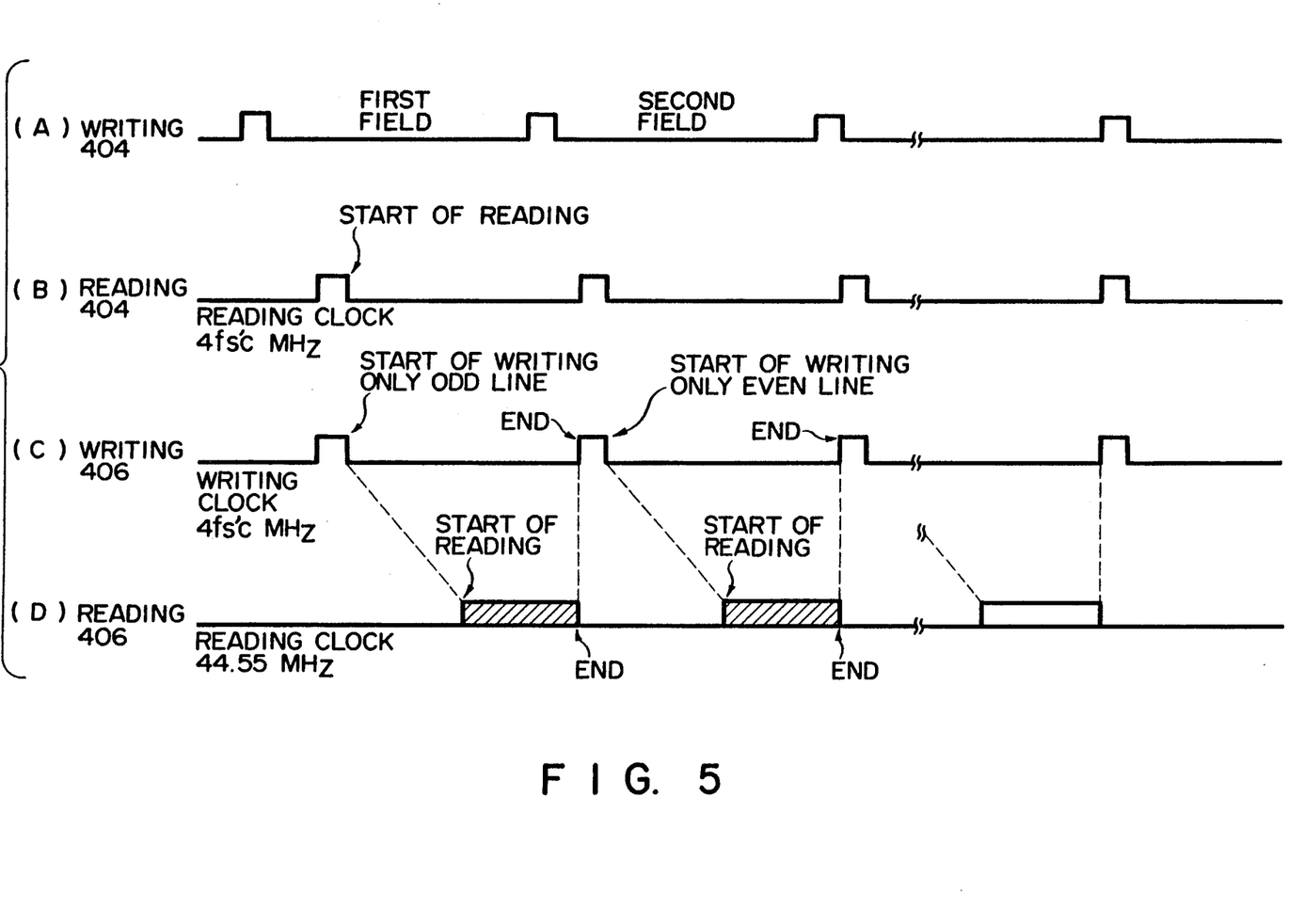
FIG. 5 is a timing chart showing the operation timing of the memory circuit shown in FIG. 4.

The signal of FIG. 5(A) is a field reset signal (59.94 Hz) representing write timing of memory circuit 11 and the signal of FIG. 5(B) is a field reset signal (60.00 Hz) representing read timing of memory circuit 11. Since memory 404 allows writing and reading operations to be asynchronously performed, sequential signals can easily be synchronized with the frame frequency of the high-definition television signal (even field E and odd field O) indicative of the large screen. The signal read out from frame synchronizing memory 404 is input to memory 406. Memory 406 also allows writing and reading operations to be asynchronously performed.

While the field frequency of the signal output from memory 404 is converted into 60.00 Hz, the signal has 525 scanning lines and it is a sequential scanning signal of 1:1. In the odd field period of the high-definition television signal, only the signal indicative of an odd line of the signal read out from memory 404 is written in memory 406. The clock frequency of the written signal is the same as that of the signal read out from memory 404. In the even field period of the high-definition signal, only the signal indicative of an even line of the signal read out from memory 404 is written in memory 406.

The signal stored in memory 406 is read out by the clock frequency (44.55 MHz) of the high-definition television signal.

While sequential scanning signals are stored in memory 404, signals of odd lines or even lines are selected from the signals read out from memory 404 and are stored in memory 406. A half of the capacity of memory 404 is will be sufficient for the capacity of memory 406. FIG. 5(C) represents a field reset signal of memory 406, and FIG. 5(D) shows read timing of memory 406. In FIG. 5(D), a signal for a screen is read out during the time period represented by oblique lines.

The present invention is not limited to the above embodiment.

Figure 6:
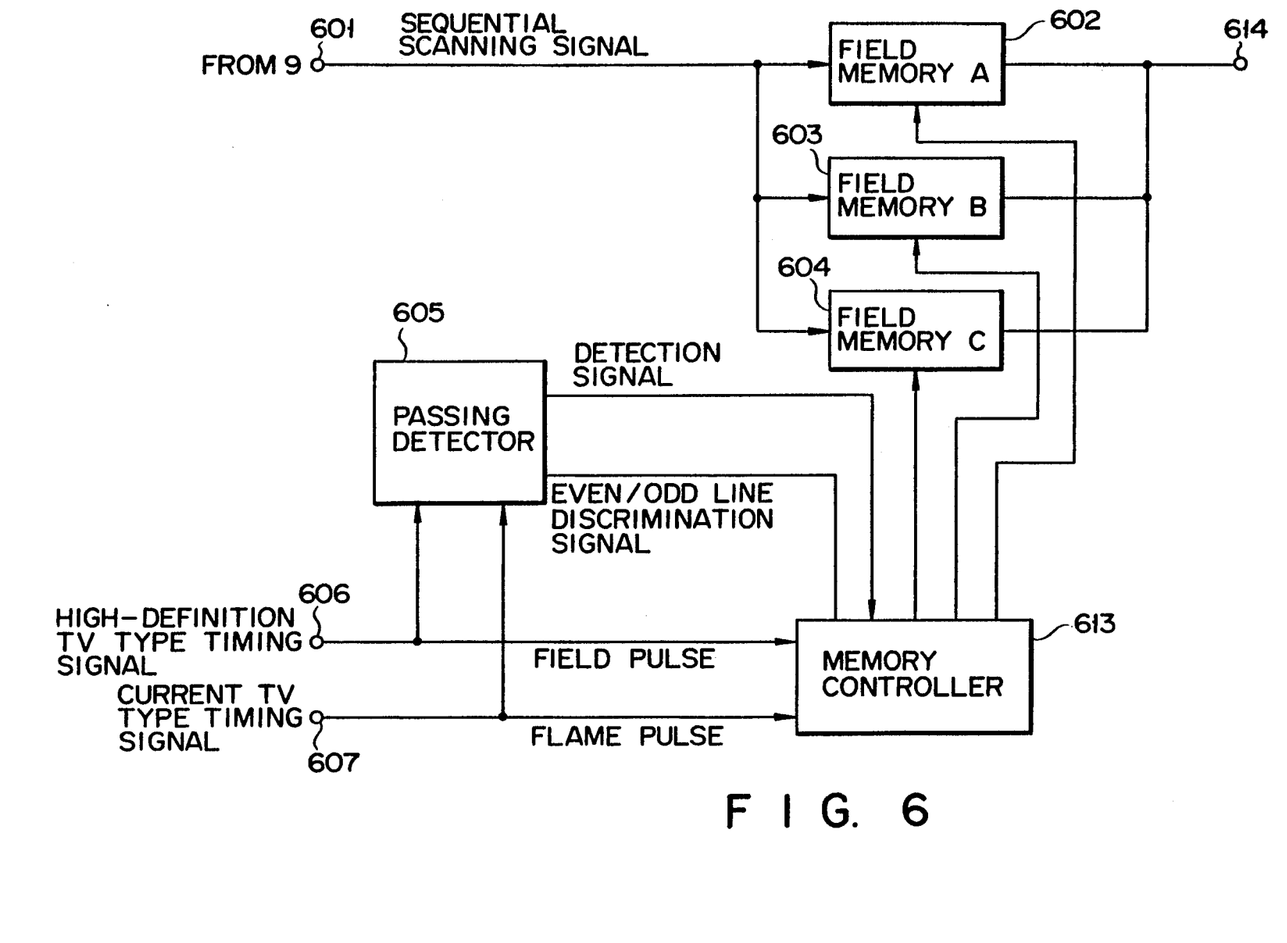
FIG. 6 is a block diagram showing another example of the memory circuit shown in FIG. 4.

FIG. 6 illustrates another embodiment of memory circuit 11. A sequential scanning signal input to terminal 601 is supplied to field memories 602, 603 and 604 each having a capacity of 1 Mbit (=455×525/2×8 bit). A current television type timing signal is supplied to terminal 607 and a high-definition television type timing signal is supplied to terminal 606, and these signals are input to passing detector 605 and memory controller 613. Passing detector 605 compares a field pulse of the current television type timing signal and that of the high-definition television type timing signal to detect a field in which the high-definition television signal representing the large screen passes the current television signal representing the small screen and then to supply a passing detection signal to memory controller 613.

Further, passing detector 605 outputs a discrimination signal for discriminating between odd and even fields of the high-definition television signal and supplies the discrimination signal to memory controller 613.

Memory controller 613 outputs a control signal for controlling the write and read timing of field memories 602, 603 and 604 using the field pulses of the current television type timing signal and the high-definition television type timing signal, the passing detection signal, and the discrimination signal.

Figure 7:
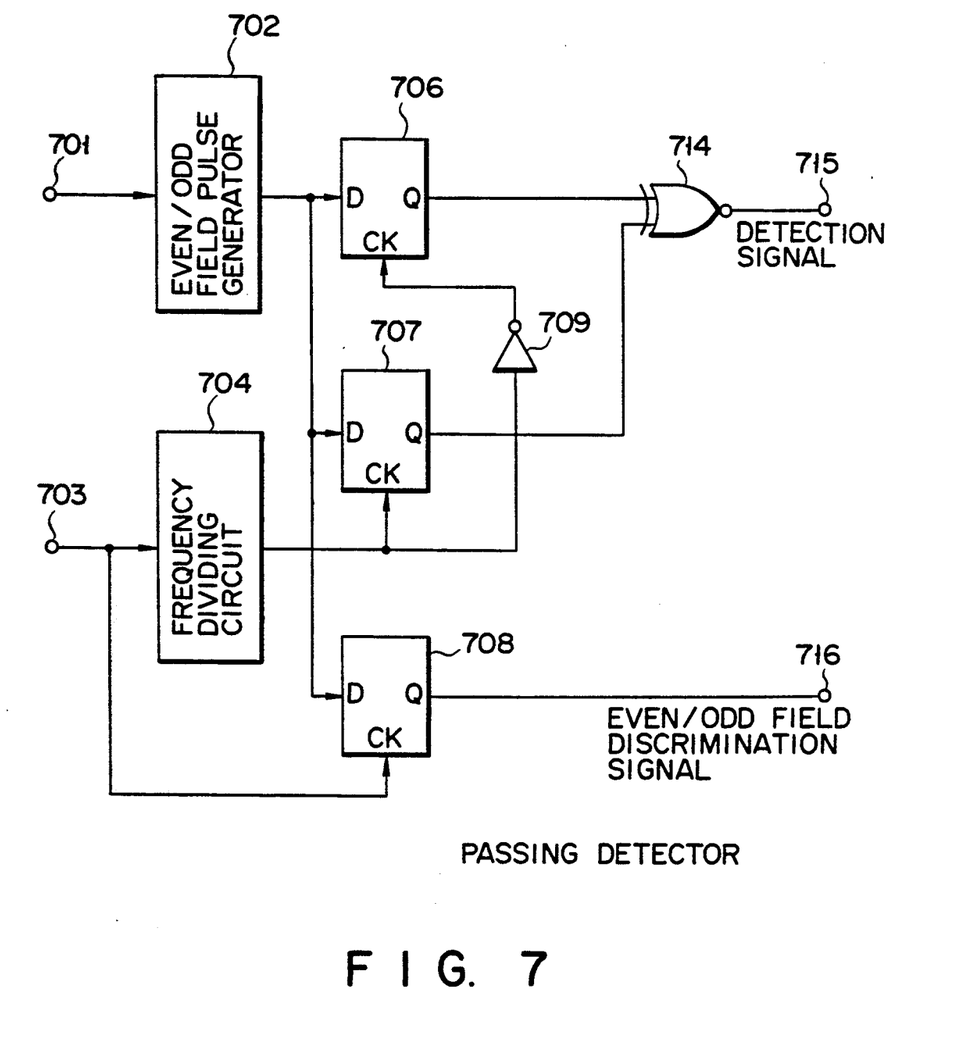
FIG. 7 is a circuit diagram specifically showing a passing detector of the memory circuit shown in FIG. 6.
Figure 8:
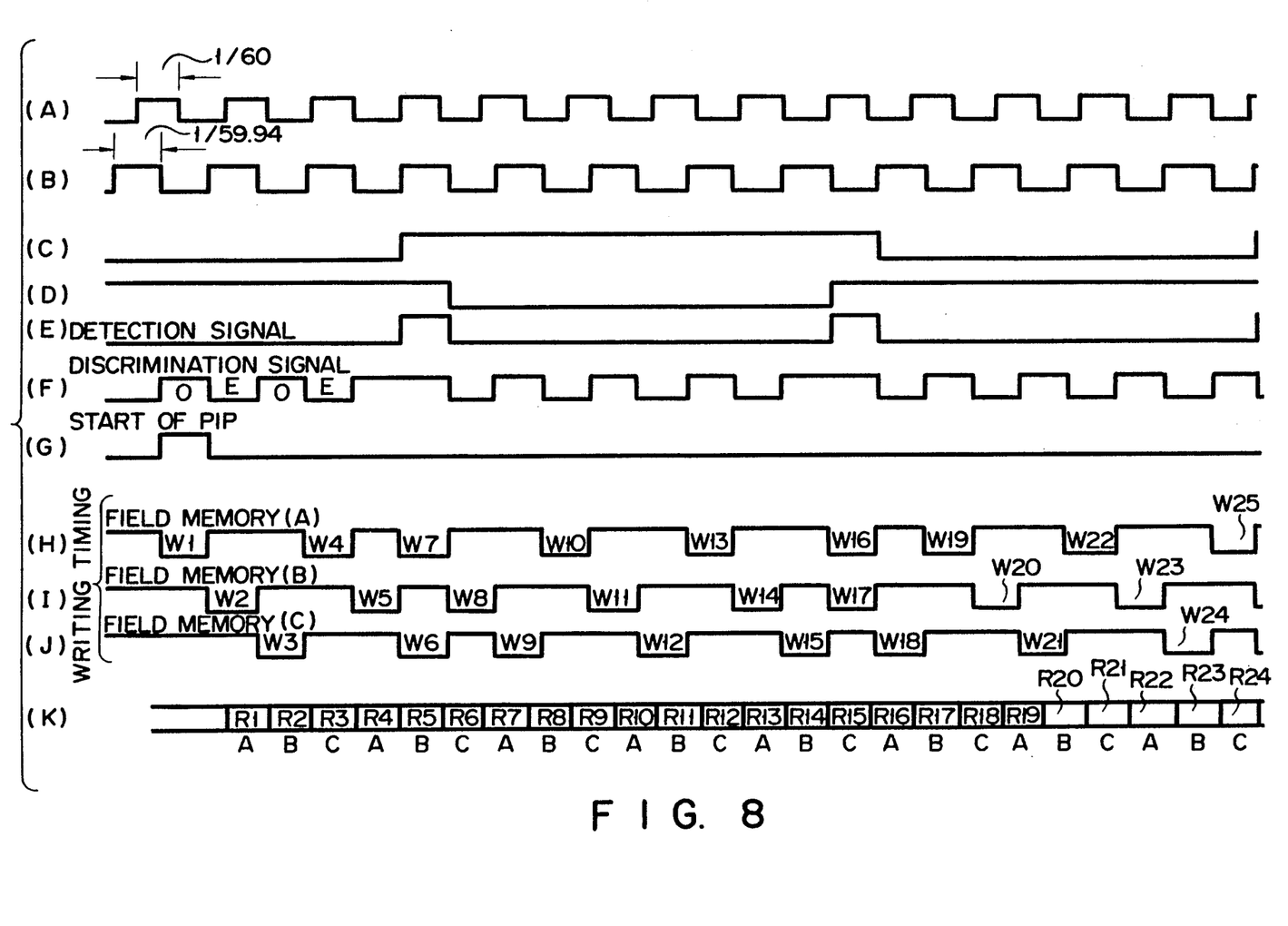
FIG. 8 is a timing chart showing the operations of the memory circuit shown in FIG. 6 and the passing detector shown in FIG. 7.

FIG. 7 is a block diagram showing passing detector 605, and FIG. 8 is a timing chart showing waveforms of operation timing of passing detector circuit 605.

In FIG. 7, a high-definition television type frame pulse is supplied to terminal 701 and then sent to even-/odd field pulse generator 702. A field identification signal output from circuit 702 is represented in FIG. 8(A). The identification signal is supplied to data input terminals of flip-flop circuits 706, 707 and 708, as illustrated in FIG. 7.

On the other hand, a current television type field pulse is input to frequency divider 704 through terminal 703 and its frequency is divided into halves. An output of the divided frequency, as shown in FIG. 8(B), is supplied to flip-flop circuit 707 as a clock signal, and it is inverted in inverter 709 and supplied to flip flop circuit 706 as a clock signal.

The outputs of flip-flop circuits 706 and 707, which are shown in FIGS. 8(D) and 8(C), are input to exclusive NOR circuit 714. The output of exclusive NOR circuit 714 is thus represented in FIG. 8(E). More specifically, when the high-definition television signal passes the current television signal, circuit 714 outputs a pulse which corresponds to the aforementioned field detection signal.

Flip-flop circuit 708 receives a frame pulse as a clock signal and supplies to terminal 716 an even/odd field discrimination signal, shown in FIG. 8(F), for discriminating the field of a sequential scanning signal.

Memory controller 613 is supplied with the current television type field pulse, high-definition television type frame pulse, passing detection signal, and even-/odd field discrimination signal.

Memory controller 613 outputs a control signal for controlling the write and read timing of field memories 602, 603 and 604. Field memories 602, 603 and 604 are controlled the writing and reading operations so that the cycles of the writing and reading operations do not overlap each other. Since the field frequency of the high-definition television signal is 60.00 Hz and that of the current television signal is 59.94 Hz, the former signal always passes the latter signal.

When the high-definition television signal passes the current television signal, if a signal is read out two times from the field of the current television signal, the frames of the high-definition television signal and the current television signal are synchronized with each other.

Usually, even or odd lines of input sequential scanning lines are written in field memories 602, 603 and 604. In a passing field period, however, the even and odd lines are separately written in two of the three field memories and all the sequential signals are therefore written therein. Whether the next field of the high-definition television signal is an odd field or an even field, signals of both the odd and even fields are prepared as signals for the small screen.

The memory circuit shown in FIG. 6 will be further described with reference to FIG. 8. FIG. 8(G) shows a pulse for informing the start of picture-in-picture (PIP). This pulse causes memory controller 613 to output signals shown in FIGS. 8(H), 8(I) and 8(J) and representing write fields corresponding to memories 602, 603 and 604. As shown in FIG. 8, the writing to the three memories is performed (w1 to w5) in a field period other than the passing field period. The lines (odd and even lines) written in the field memories depend on the even/odd field discrimination signal (FIG. 8(F)) output from passing detector 605. In FIG. 8 (F), when the even/odd field discrimination signal represents an odd field, an odd line is written in the memory and, when the signal represents an even field, an even line is written.

When a detection signal indicative of the passing field is produced, as illustrated in FIG. 8(E), the even/odd field discrimination signal is inverted and written (w6) in memory 604 (FIG. 8 (J)). Further, memory 602 (FIG. 8 (H)), which originally writes the signals in the next field, is so controlled as to perform the writing operation (w7) in the same frame as that of writing operation (w6).

In the field next to (w6) and (w7), memory 603 (FIG. 8 (I)), which originally performs the writing operation in the next field, performs the writing operation (w8) in accordance with the even/odd field discrimination signal. In the further next field, memory 604 writes a signal in accordance with the even/odd field discrimination signal (w9). These three field memories thus perform their writing operations in the preceding fields. From the field next to the field of writing operation (w9), the field memories repeat normal operations (w10 to w12).

On the other hand, the reading operations of three field memories 602, 603 and 604 are carried out at the same clock rate (44.55 MHz) as that of the above embodiment in synchronism with the high-definition television signal during the available period of the small screen (FIG. 8 (k)).

Comparing (H) to (J) with (K) in FIG. 8, it turns out that the writing time hardly overlaps the reading time and the signals are processed in the memories. The signals output from the memories in this manner form two screens in which a current-type television image is inserted into a high-definition television image.

As described above, the current television signals are converted into sequential signal by motion adaptive sequential scanning line conversion and read out in accordance with the even and odd fields stored in the memories. It is thus possible to insert a small screen image, whose vertical definition is not degraded at all with respect to the current television signal, into the high-definition television image.

As has been described, the present invention allows a current television screen to be inserted into a high-definition television screen.

In the above embodiments, A/D converter 3, Y/C separation circuit 5, sequential scanning convertor 9 and sync separation circuit 6 are used exclusively to generate signals representative of the small screen. However, the arrangement of these circuits is an arrangement of an EDTV circuit which is essential to a system for receiving MUSE signals which are not compatible with current television signals. In the present invention, therefore, the EDTV circuit is utilized more effectively.

What is claimed is:

1. A multi-screen high-definition television receiver comprising:

first means for receiving and demodulating a first interlaced scanning television signal;

second means for receiving and demodulating a second interlaced scanning television signal whose scanning lines are about twice as many as that of the first interlaced scanning television signal;

sequential scanning conversion means for converting the first interlaced scanning television signal output from said first means into a sequential scanning television signal;

memory means for synchronizing the sequential scanning television signal output from said sequential scanning conversion means with a field frequency of the second interlaced scanning television signal, time-compressing the sequential scanning television signal and, converting the sequential scanning television signal into a third interlaced scanning television signal in accordance with even and odd fields of the second interlaced scanning television signal; and means for selectively producing a fourth interlaced scanning television signal output from said memory means and the second interlaced scanning television signal.

2. A multi-screen high-definition television receiver according to claim 1, wherein said sequential scanning conversion means comprises:

a first speed change converter for changing a speed of a scanning line of the first television signal;

a first field memory for delaying the first television signal for one field period;

a second field memory for delaying the first television signal for one field period;

a one horizontal period delay circuit for delaying the first television signal for one horizontal period;

an adder for adding the input and output signals of the one horizontal period delay circuit;

a motion detector for detecting a part of a motion image of the first television signal by using the input of the first field memory and the output of the second field memory;

a mixture circuit for mixing the outputs from the first field memory and the adder in the mixing ratio of these outputs according to the motion detection signal;

a second speed change converter for changing a speed of a scanning line of the output of the mixture circuit; and a selector for alternately selecting the outputs of the first and second speed change converters.

* * * * *